United States Patent [19]

Sunter

[11] 3,972,518
[45] Aug. 3, 1976

[54] CUPOLA EMISSION CONTROL SYSTEM

[75] Inventor: Thomas C. Sunter, Allentown, Pa.

[73] Assignee: Fuller Company, Catasauqua, Pa.

[22] Filed: Nov. 23, 1973

[21] Appl. No.: 418,705

[52] U.S. Cl. .............................................. 266/147
[51] Int. Cl.² .......................................... C21C 1/06
[58] Field of Search .................. 266/15, 16, 17, 147

[56] References Cited
UNITED STATES PATENTS

| | | | |
|---|---|---|---|
| 2,761,671 | 9/1956 | Tinker | 266/17 |
| 3,518,817 | 7/1970 | Dell'Agnese et al. | 266/17 X |
| 3,605,386 | 9/1971 | Erwin et al. | 266/15 X |
| 3,666,248 | 5/1972 | Frundl et al. | 266/17 X |
| 3,731,910 | 5/1973 | Butler | 266/15 |

FOREIGN PATENTS OR APPLICATIONS 379,361    1932  United Kingdom................... 266/20

OTHER PUBLICATIONS

*The Coupla & Its Operation*, American Foundrymen's Society, Third Edition, 1965, p. 85.

*Primary Examiner*—Roy Lake
*Assistant Examiner*—Paul A. Bell
*Attorney, Agent, or Firm*—Frank H. Thomson

[57] ABSTRACT

The invention discloses a method and apparatus for conditioning the gases discharged from a cupola. The apparatus consists of three flow connected vessels comprising first the cupola with improved gas conditioning means therein, secondly, a water spray tower and thirdly, a baghouse dust collector. The improved gas conditioning method and apparatus comprises a movably mounted conduit and nozzle for spraying cooling water through the cupola charge door during the burn-down period of cupola operation when the bed gas is not used to pre-heat the new charges in the cupola. The cooling water is used instead of large quantities of dilution air to temper the discharge gas at this point. Therefore, by the improved method, during burn-down the temperature of the discharged gas can be maintained at slightly above the normal cupola operational temperature without requiring discharge ducts and dust collection capacity for the additional dilution air. The elimination of the additional dilution air results in a corresponding decrease in the size and expense of the discharge ducts and the dust collecting system.

1 Claim, 2 Drawing Figures

CUPOLA EMISSION CONTROL SYSTEM

BACKGROUND OF THE INVENTION

The present invention provides an improved method and apparatus for conditioning the gases discharged from a cupola that is used to process material, such as in iron melting, in order to decrease the cost of controlling air pollution.

In processes and apparatus of the prior art, as in U.S. Pat. No. 3,518,817, water spray towers have been used in combination with secondary gas conditioning means such as a gas scrubber and separator stack. In such devices, the secondary conditioning apparatus are generally designed to accommodate the condition of the gases discharged from the cupola, usually referred to as "off-gas", during the "burn-down" period of operation. The burn-down period is understood to mean that period of time near the end of the processing of material when the addition of charge to the cupola is discontinued. It is during this period that the heat of the gas which is rising through the bed of material, usually referred to as "bed-gas", is no longer used to preheat the charge of metal, coke and flux. The extra heat therefore is discharged through the cupola stack at temperatures approaching 2700°F. This additional heat increases the size and cost of equipment which is necessary to comply with pollution control regulations. For example, the discharge duct which conveys the off-gas from the top of the cupola stack to a subsequent dust control apparatus such as a spray tower may be refractory lined at temperatures up to 1800°F with silica-based refractories. If the temperature in the duct were permitted to exceed 1800°F heavier, more expensive alumina-based refractories would be necessary.

The alumina-based refractories are nearly twice as heavy as the silica, resulting in turn with the necessity of increased structural costs for support. Additionally, the alumina-based refractories are less resistant to abrasion than silica-based refractories, so that maintenance costs are also increased by the use of alumina-based refractories.

Therefore, in an effort to reduce the temperature of the bed-gas during burn-down to normal operating temperatures of below 1800°F at the stack, apparatus of the prior art have added large quantities of dilution air through the charge door. The past design criteria therefore has been to accommodate the additional quantity of dilution air, which may be an additional 20% to 25% of the normal off-gas, and to design the capacity of the gas discharge ducts and dust collection system according to the increased quantity of gas. In other words, the prior art has found it necessary, as part of their gas conditioning systems, to provide ducts and dust collector systems for the burn-down period which are up to 25% larger than the ducts and systems which are necessary during normal operation of the cupola.

SUMMARY

It is, therefore, the purpose of the present invention to provide a method and apparatus for the conditioning of gas which is discharged from a cupola that will reduce the size and capacity of subsequent gas discharge ducts and secondary gas condition systems.

It is another object of the present invention to decrease the overall initial cost of constructing a gas conditioning system for a cupola by utilizing less expensive refractory lining materials.

The objects of the present invention will be achieved by providing an improved method and apparatus for conditioning the gases which are discharged from a cupola having a vertically elongated refractory line vessel, means for supplying to said vessel air for combustion, fuel, flux, and material to be processed; means for discharging gases of combustion; means for discharging processed material; and means for oxidizing the bed-gases; the improvement comprising conditioning said gases which are discharged from a cupola by providing a method of, and apparatus for, cooling said gases with a liquid whenever the charge to the cupola is discontinued.

BRIEF DESCRIPTION OF THE DRAWINGS

The invention will be described in connection with the annexed drawing wherein.

DESCRIPTION OF THE PREFERRED EMBODIMENTS

Figure 1:
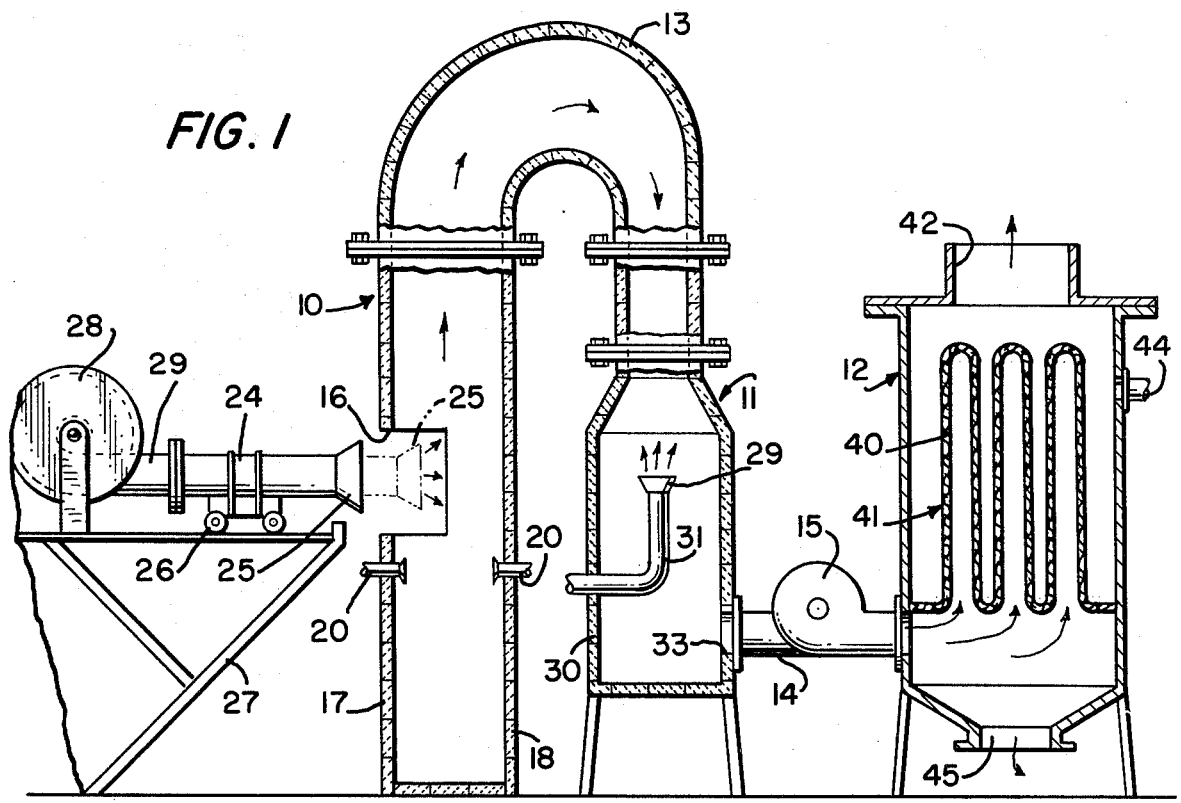
FIG. 1 is a diagrammatic view showing apparatus by which the method of the present invention may be achieved as in a cupola flow connected to secondary gas conditioning vessels.

Referring to FIG. 1, cupola 10 is shown generally in relationship with a secondary gas conditioning system consisting of a spray tower 11 and dust collector 12. It should be understood that other secondary gas conditioning apparatus such as gas scrubbers and separators or electrostatic precipitators may also be used as part of, or in place of, the secondary gas conditioning system shown in the preferred embodiment. All vessels are serially flow connected as by refractory lined conduit 13 and conduit 14 which generally need not be refractory lined. Additionally, fan 15 is used to convey gas between the spray tower 11 and the dust collector 12.

The material to be processed, fuel, and flux are fed into cupola 10 through charge door 16 in cupola side wall 17. All of these products are preheated by the bed gases which rise upwardly in the cupola towards the charge door 16. Periodic charging of the cupola is the normal cycle of operation. The final processing of material occurs in the lower portion 18 of the cupola. Bed gas containing dust particulates and gaseous products of incomplete combustion such as carbon monoxide rise upwardly towards cross-over conduit 13. In order to assure complete combustion of the bed gas, oxidizing means such as gas burners 20, are located in side wall 17 near the charge door 16. Burners 20 maintain the temperature of the bed gas at not less than 1300°F in this region of the cupola, as required by some state laws, in order to assure that all carbon monoxide is oxidized to carbon dioxide.

During normal operation of the cupola, bed gas continues upwardly past charge door 16 through which a small quantity of dilution air is drawn. In this mode of operation, the temperature at the cross-over conduit 13 will generally not exceed 1800°F at this point. The off-gas then passes through conduit 13 and enters spray tower 11 wherein the gas is impinged by cooling fluid conveyed through at least one nozzle 29 which may be located through tower side walls 30 or directly in the path of the gas as shown in FIG. 1. Nozzle 29 is connected by conduit 31 to a source of cooling fluid (not shown). The cooling spray reduces the temperature of the off-gas to approximately 600°F. The cooled gas passes through gas outlet 33 which is flow connected to conduit 14. Conduit 14 is, in turn, flow connected to fan 15 which draws cooled gas out of spray tower 11 and conveys the gas to a third conditioning vessel 12, such as a dust collector, where the off-gas is further conditioned. In the embodiment as shown the gas passes upward through a gas permeable fabric 40 of dust collecting bags 41 and the gas is then discharged to the atmosphere through outlet 42. Particulate material is collected on the inside of the bags. After a build-up of particulate material inside bags 40 has occurred, the bags may be cleaned by periodically isolating a series of bags and reversing the flow of gas through the bags by means of an auxiliary source of gas under pressure (not shown) through conduit 44. The sudden reverse air flow through bags 41 dislodges collected particulate material which then falls through the vessel to the bottom outlet 45 and is collected in a hopper or conveyed by conveyors (not shown) as usable by-product or merely as waste. It should be understood by those skilled in the art that many variations as to the operation of the dust collecting baghouse are possible and that a preferred embodiment has been shown by way of illustration only. For example, conduit 14 could enter at the top of vessel 12 so that the gas passes downwardly outside of the bags. Dust will be collected on the outside of the bags as the gas passes through the gas permeable fabric towards a discharge manifold connected to the inside of the bag bottoms. Such variation will not significantly affect the capacity of the dust collecting baghouse.

During the burn-down operation of the cupola, the material to be processed, coke, and flux are no longer fed through the charge door opening 16. Therefore, these products are not preheated by bed-gas rising through the cupola. In order to prevent the temperature of the off-gas at the cross-over conduit 13 from exceeding 1800°F the method and apparatus of the present invention for cooling the bed-gas with a liquid in the cupola are used. As shown in FIG. 1, this method of cooling the gases with a liquid may be accomplished by means of at least one movably mounted conduit 24 and nozzle 25 of the present invention which is moved from the position shown by the solid lines, by retractable means such as roller 26, frame 27, and take-up reel 28, to the position shown by the dashed lines. Flexible pipe or hose 29 is connected between a source of water (not shown) and conduit 24. Conduit 24 and nozzle 25 may be introduced into cupola 10 through charge door 16. Cooling water is sprayed against the bed-gas during burn-down to maintain the temperature of the off-gas below 1800°F at cross-over conduit 13. Therefore large quantities of dilution air are not necessary to maintain a safe temperature below 1800°F at conduit 13. The elimination of the additional dilution air results in a decrease in the size and capacity of the dust collectors. Without the method of spraying described above, the bed gas without dilution air will reach approximately 2700°F at conduit 13. Such temperature levels would have a detrimental effect upon conduit 13 and upon the subsequent conditioning apparatus. The resulting savings occur because no additional dilution air has to pass through the ducting and secondary conditioning vessels such as the spray tower and dust collector.

When the water conduit 24 of the present invention is not in use, as during start-up or normal charge operation of the cupola, conduit 24 is removed from its position in the charge door opening in order to prevent heat damage to nozzle 25 and to avoid interference with the charging operation.

Figure 2:
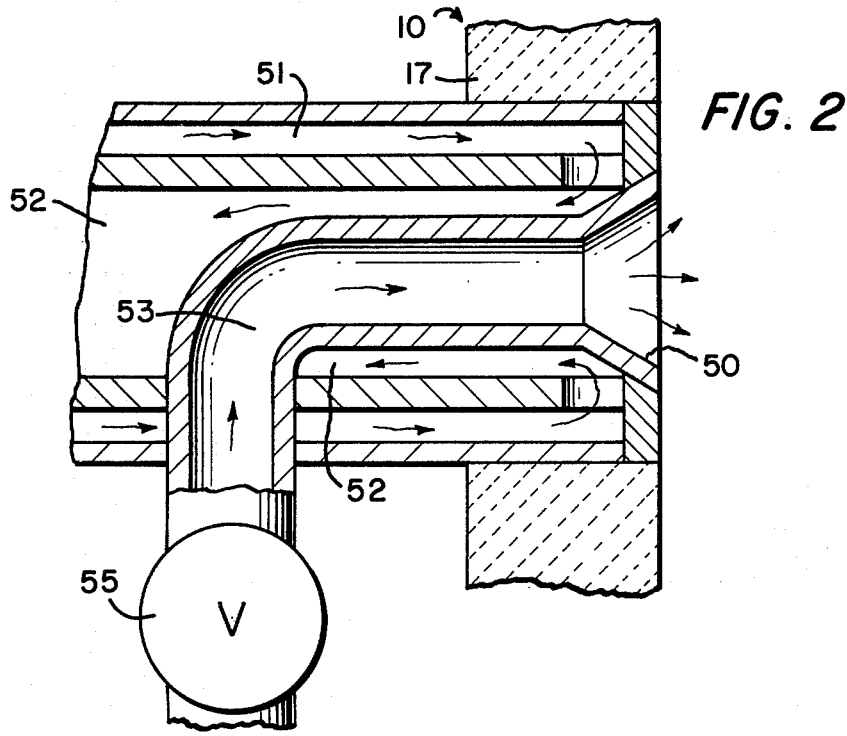
FIG. 2 is a partial sectional view of a cupola by which the method of the present invention may alternately be achieved.

In FIG. 2 is shown apparatus by which the method of the present invention may alternately be achieved. At least one water or air cooled nozzle 50 is shown flow connected to a series of concentric conduits 51, 52, and 53. The conduits are permanently fixed through side wall 17 of cupola 10 and thus provide a means for conveying cooling water from a source of cooling water (not shown) through nozzle 50 to cool the bed gas. During normal operation of the cupola a cooling fluid such as water or air will be continuously conveyed through the outer conduit 51 and withdrawn through conduit 52 to prevent heat damage to nozzle 50 when not in use.

During the burn-down operation, valve 55 may be manually or automatically opened to permit cooling water to be conveyed through central conduit 53 and nozzle 50 to the off-gas in order to achieve the method of conditioning the cupola bed gas as described above with respect to the removable nozzle of FIG. 1. Fixed nozzle 50 will provide an alternate apparatus for achieving the method of the present invention other than by removable nozzle 26. It will be apparent that a constantly flowing cooling fluid will be necessary to protect fixed nozzle 50 during long periods of nonuse. However, the cost savings in the reduction in size of secondary conditioning vessels such as a dust collector will more than offset the cost of achieving the method of the present invention by the fixed nozzle 50.

Thus by the use of either nozzle 26 or nozzle 50 to achieve the method of the present invention, that is the method of substituting water cooling at the charge door level of the cupola, it will be apparent that the size of the ducting, spray tower, and dust collector will be significantly reduced. It is believed that a savings of 20% to 25% may be realized by the method and apparatus of the present invention.

It is to be understood that the method and apparatus described above is merely illustrative of the preferred method and embodiment and that modifications such as will occur to one skilled in the art are intended to be within the scope of the invention as claimed. Therefore, it is intended that the invention be limited solely by that which is within the scope of the appended claim.

I claim:

1. An improved apparatus for conditioning the gases of combustion in a cupola having elongated sidewalls, a charge door and a gas discharge, said improved apparatus comprising:
    a first conditioning means in said cupola for oxidizing the gases of combustion;
    a second conditioning means in said cupola including a first means for selectively supplying cooling water through said charge door for cooling the gases discharged from said cupola when charging of said cupola is discontinued;
    a third conditioning means flow connected to said cupola by a first conduit means, said third conditioning means including a vessel having a second means for selectively cooling with water the gases discharged from said cupola;
    a fourth conditioning means flow connected to said third conditioning means by a second conduit means, said fourth conditioning means including means for separating and collecting particulate material from the gases discharged from said cupola having sufficient capacity to separate the particulate material from the gas while said cupola is being charged
said first means for selectively cooling with water the gases discharged from said cupola further includes movably mounted conduit means for conveying cooling water from a source to said cupola, a nozzle means for dispersing said cooling water in said cupola, and means for introducing said nozzle into said cupola while cooling water is conveyed and removing said nozzle from said cupola while water is not conveyed.

* * * * *